(12) United States Patent
Pogodin

(10) Patent No.: US 8,250,041 B2
(45) Date of Patent: Aug. 21, 2012

(54) METHOD AND APPARATUS FOR PROPAGATION OF FILE PLANS FROM ENTERPRISE RETENTION MANAGEMENT APPLICATIONS TO RECORDS MANAGEMENT SYSTEMS

(75) Inventor: Andrey Pogodin, San Mateo, CA (US)

(73) Assignee: International Business Machines Corporation, Armonk, NY (US)

( * ) Notice: Subject to any disclaimer, the term of this patent is extended or adjusted under 35 U.S.C. 154(b) by 297 days.

(21) Appl. No.: 12/645,351

(22) Filed: Dec. 22, 2009

(65) Prior Publication Data

US 2011/0153578 A1 Jun. 23, 2011

(51) Int. Cl.
G06F 7/00 (2006.01)
(52) U.S. Cl. .................... 707/662; 707/756
(58) Field of Classification Search .............. 707/662, 707/665, 667, 756; 711/161–162
See application file for complete search history.

(56) References Cited

U.S. PATENT DOCUMENTS

| | | |
|---|---|---|
| 5,355,497 A | 10/1994 | Cohen-Levy |
| 5,608,865 A | 3/1997 | Midgely et al. |
| 5,701,472 A | 12/1997 | Koerber et al. |
| 5,875,431 A | 2/1999 | Heckman et al. |
| 5,903,879 A | 5/1999 | Mitchell |
| 5,963,964 A | 10/1999 | Nielsen |
| 6,049,812 A | 4/2000 | Bertram et al. |
| 6,115,642 A | 9/2000 | Brown et al. |
| 6,128,620 A | 10/2000 | Pissanos et al. |
| 6,151,031 A | 11/2000 | Atkins et al. |
| 6,173,270 B1 | 1/2001 | Cristofich et al. |
| 6,330,572 B1 | 12/2001 | Sitka |
| 6,332,125 B1 | 12/2001 | Callen et al. |
| 6,343,287 B1 | 1/2002 | Kumar et al. |
| 6,401,079 B1 | 6/2002 | Kahn et al. |
| 6,425,764 B1 | 7/2002 | Lamson |
| 6,460,060 B1 | 10/2002 | Maddalozzo, Jr. et al. |
| 6,539,379 B1 | 3/2003 | Vora et al. |
| 6,553,365 B1 * | 4/2003 | Summerlin et al. .......... 707/740 |
| 6,607,389 B2 | 8/2003 | Genevie |
| 6,622,128 B1 | 9/2003 | Bedell et al. |
| 6,738,760 B1 | 5/2004 | Krachman |
| 6,805,351 B2 | 10/2004 | Nelson |
| 6,832,205 B1 | 12/2004 | Aragones et al. |
| 6,839,682 B1 | 1/2005 | Blume et al. |

(Continued)

FOREIGN PATENT DOCUMENTS

EP 2110781 A1 10/2009

OTHER PUBLICATIONS (JISC infoNet. HEI Records Management: Guidance on Developing a File Plan. Jan. 1, 2007.*

(Continued)

*Primary Examiner* — Robert Timblin
(74) *Attorney, Agent, or Firm* — Shumaker & Sieffert, P.A.

(57) ABSTRACT

Integration between Enterprise Records Management systems (ERMs) and Records Management Systems (RMSs) is provided, thus providing a robust record classification and retention schedule enforcement process in large enterprises. Typically, ERMs have been designed from the ground up to be highly scalable across multiple national and regional jurisdictions, whereas RMS's were primarily departmental. Proper integration between ERMs and RMSs, as provided by the invention, allows corporations to deploy larger scale multi-organizational instances of RMSs, thus achieving a better level of control and significant economies of scale.

24 Claims, 11 Drawing Sheets

U.S. PATENT DOCUMENTS

| | | |
|---|---|---|
| 6,944,597 B2 | 9/2005 | Callen et al. |
| 6,966,053 B2 | 11/2005 | Paris et al. |
| 6,976,083 B1 | 12/2005 | Baskey et al. |
| 6,981,210 B2 | 12/2005 | Peters et al. |
| 7,076,439 B1 | 7/2006 | Jaggi |
| 7,082,573 B2 | 7/2006 | Apparao et al. |
| 7,103,601 B2 | 9/2006 | Nivelet |
| 7,103,602 B2 | 9/2006 | Black et al. |
| 7,104,416 B2 | 9/2006 | Gasco et al. |
| 7,107,416 B2 | 9/2006 | Stuart et al. |
| 7,127,470 B2 | 10/2006 | Takeya |
| 7,146,388 B2 * | 12/2006 | Stakutis et al. ............... 1/1 |
| 7,162,427 B1 | 1/2007 | Myrick et al. |
| 7,197,716 B2 | 3/2007 | Newell |
| 7,206,789 B2 | 4/2007 | Hurmiz et al. |
| 7,225,249 B1 | 5/2007 | Barry et al. |
| 7,233,959 B2 * | 6/2007 | Kanellos et al. ............. 1/1 |
| 7,236,953 B1 | 6/2007 | Cooper et al. |
| 7,240,296 B1 | 7/2007 | Matthews et al. |
| 7,249,315 B2 | 7/2007 | Moetteli |
| 7,281,084 B1 | 10/2007 | Todd et al. |
| 7,283,985 B2 | 10/2007 | Schauerte et al. |
| 7,284,985 B2 | 10/2007 | Genevie |
| 7,333,989 B1 | 2/2008 | Sameshima et al. |
| 7,386,468 B2 | 6/2008 | Calderaro et al. |
| 7,433,832 B1 | 10/2008 | Bezos et al. |
| 7,451,155 B2 * | 11/2008 | Slackman et al. ............. 1/1 |
| 7,478,096 B2 | 1/2009 | Margolus et al. |
| 7,496,534 B2 | 2/2009 | Olsen et al. |
| 7,502,891 B2 | 3/2009 | Shachor |
| 7,512,636 B2 | 3/2009 | Verma et al. |
| 7,558,853 B2 | 7/2009 | Alcorn et al. |
| 7,580,961 B2 | 8/2009 | Todd et al. |
| 7,594,082 B1 | 9/2009 | Kilday et al. |
| 7,596,541 B2 | 9/2009 | deVries et al. |
| 7,614,004 B2 | 11/2009 | Milic-Frayling et al. |
| 7,617,458 B1 | 11/2009 | Wassom, Jr. et al. |
| 7,636,886 B2 | 12/2009 | Wyle et al. |
| 7,720,825 B2 | 5/2010 | Pelletier et al. |
| 7,730,148 B1 | 6/2010 | Mace et al. |
| 7,742,940 B1 | 6/2010 | Shan et al. |
| 7,774,721 B2 | 8/2010 | Milic-Frayling et al. |
| 7,778,976 B2 | 8/2010 | D'Souza et al. |
| 7,861,166 B1 | 12/2010 | Hendricks |
| 7,865,817 B2 | 1/2011 | Ryan et al. |
| 7,895,229 B1 | 2/2011 | Paknad |
| 7,962,843 B2 | 6/2011 | Milic-Frayling et al. |
| 8,073,729 B2 | 12/2011 | Kisin et al. |
| 2001/0053967 A1 | 12/2001 | Gordon et al. |
| 2002/0007333 A1 | 1/2002 | Scolnik et al. |
| 2002/0010708 A1 | 1/2002 | McIntosh |
| 2002/0022982 A1 | 2/2002 | Cooperstone et al. |
| 2002/0035480 A1 | 3/2002 | Gordon et al. |
| 2002/0083090 A1 | 6/2002 | Jeffrey et al. |
| 2002/0091553 A1 | 7/2002 | Callen et al. |
| 2002/0091836 A1 | 7/2002 | Moetteli |
| 2002/0095416 A1 | 7/2002 | Schwols |
| 2002/0103680 A1 | 8/2002 | Newman |
| 2002/0108104 A1 | 8/2002 | Song et al. |
| 2002/0119433 A1 | 8/2002 | Callender |
| 2002/0120859 A1 | 8/2002 | Lipkin et al. |
| 2002/0123902 A1 | 9/2002 | Lenore et al. |
| 2002/0143595 A1 | 10/2002 | Frank et al. |
| 2002/0143735 A1 | 10/2002 | Ayi et al. |
| 2002/0147801 A1 | 10/2002 | Gullotta et al. |
| 2002/0162053 A1 | 10/2002 | Os |
| 2002/0178138 A1 | 11/2002 | Ender et al. |
| 2002/0184068 A1 | 12/2002 | Krishnan et al. |
| 2002/0184148 A1 | 12/2002 | Kahn et al. |
| 2003/0004985 A1 | 1/2003 | Kagimasa et al. |
| 2003/0014386 A1 | 1/2003 | Jurado |
| 2003/0018663 A1 | 1/2003 | Cornette et al. |
| 2003/0018693 A1 | 1/2003 | Rosenfeld et al. |
| 2003/0031991 A1 | 2/2003 | Genevie |
| 2003/0033295 A1 | 2/2003 | Adler et al. |
| 2003/0036994 A1 | 2/2003 | Witzig et al. |
| 2003/0046287 A1 | 3/2003 | Joe |
| 2003/0051144 A1 | 3/2003 | Williams |
| 2003/0069839 A1 | 4/2003 | Whittington et al. |
| 2003/0074354 A1 | 4/2003 | Lee et al. |
| 2003/0097342 A1 | 5/2003 | Whittington |
| 2003/0110228 A1 | 6/2003 | Xu et al. |
| 2003/0139827 A1 | 7/2003 | Phelps |
| 2003/0229522 A1 | 12/2003 | Thompson et al. |
| 2004/0002044 A1 | 1/2004 | Genevie |
| 2004/0003351 A1 | 1/2004 | Sommerer et al. |
| 2004/0019496 A1 | 1/2004 | Angle et al. |
| 2004/0034659 A1 | 2/2004 | Steger |
| 2004/0039933 A1 | 2/2004 | Martin et al. |
| 2004/0060063 A1 | 3/2004 | Russ et al. |
| 2004/0068432 A1 | 4/2004 | Meyerkopf et al. |
| 2004/0078368 A1 | 4/2004 | Excoffier et al. |
| 2004/0088283 A1 | 5/2004 | Lissar et al. |
| 2004/0088332 A1 | 5/2004 | Lee et al. |
| 2004/0088729 A1 | 5/2004 | Petrovic et al. |
| 2004/0103284 A1 | 5/2004 | Barker |
| 2004/0133573 A1 | 7/2004 | Miloushev et al. |
| 2004/0138903 A1 | 7/2004 | Zuniga |
| 2004/0143444 A1 | 7/2004 | Opsitnick et al. |
| 2004/0187164 A1 | 9/2004 | Kandasamy et al. |
| 2004/0193703 A1 | 9/2004 | Loewy et al. |
| 2004/0204947 A1 | 10/2004 | Li et al. |
| 2004/0215619 A1 | 10/2004 | Rabold |
| 2004/0216039 A1 * | 10/2004 | Lane et al. .................. 715/511 |
| 2004/0260569 A1 | 12/2004 | Bell et al. |
| 2005/0060175 A1 | 3/2005 | Farber et al. |
| 2005/0071251 A1 | 3/2005 | Linden et al. |
| 2005/0071284 A1 | 3/2005 | Courson et al. |
| 2005/0074734 A1 | 4/2005 | Randhawa |
| 2005/0114241 A1 | 5/2005 | Hirsch et al. |
| 2005/0144114 A1 | 6/2005 | Ruggieri et al. |
| 2005/0160361 A1 * | 7/2005 | Young .......................... 715/513 |
| 2005/0165734 A1 | 7/2005 | Vicars et al. |
| 2005/0187813 A1 | 8/2005 | Genevie |
| 2005/0203821 A1 | 9/2005 | Petersen et al. |
| 2005/0240578 A1 | 10/2005 | Bieferman, Sr. et al. |
| 2005/0246451 A1 | 11/2005 | Silverman et al. |
| 2005/0283346 A1 | 12/2005 | Elkins, II et al. |
| 2006/0036464 A1 | 2/2006 | Cahoy et al. |
| 2006/0036649 A1 | 2/2006 | Simske et al. |
| 2006/0074793 A1 | 4/2006 | Hibbert et al. |
| 2006/0095421 A1 | 5/2006 | Nagai et al. |
| 2006/0126657 A1 | 6/2006 | Beisiegel et al. |
| 2006/0136435 A1 | 6/2006 | Nguyen et al. |
| 2006/0143248 A1 | 6/2006 | Nakano et al. |
| 2006/0143464 A1 * | 6/2006 | Ananthanarayanan et al. .................. 713/182 |
| 2006/0149407 A1 | 7/2006 | Markham et al. |
| 2006/0149735 A1 | 7/2006 | DeBie et al. |
| 2006/0156381 A1 | 7/2006 | Motoyama |
| 2006/0156382 A1 * | 7/2006 | Motoyama .................... 726/1 |
| 2006/0167704 A1 | 7/2006 | Nicholls et al. |
| 2006/0174320 A1 | 8/2006 | Maru et al. |
| 2006/0178917 A1 | 8/2006 | Merriam et al. |
| 2006/0184718 A1 | 8/2006 | Sinclair |
| 2006/0195430 A1 | 8/2006 | Arumainayagam et al. |
| 2006/0229999 A1 | 10/2006 | Dodell et al. |
| 2006/0230044 A1 | 10/2006 | Utiger |
| 2006/0235899 A1 * | 10/2006 | Tucker .......................... 707/200 |
| 2006/0242001 A1 | 10/2006 | Heathfield |
| 2007/0016546 A1 | 1/2007 | De Vorchik et al. |
| 2007/0048720 A1 | 3/2007 | Billauer |
| 2007/0061156 A1 | 3/2007 | Fry et al. |
| 2007/0061157 A1 | 3/2007 | Fry et al. |
| 2007/0078900 A1 | 4/2007 | Donahue |
| 2007/0099162 A1 | 5/2007 | Sekhar |
| 2007/0100857 A1 | 5/2007 | DeGrande et al. |
| 2007/0112783 A1 | 5/2007 | McCreight et al. |
| 2007/0118556 A1 | 5/2007 | Arnold et al. |
| 2007/0156418 A1 | 7/2007 | Richter et al. |
| 2007/0162417 A1 | 7/2007 | Cozianu et al. |
| 2007/0179829 A1 | 8/2007 | Laperi et al. |
| 2007/0203810 A1 | 8/2007 | Grichnik |
| 2007/0208690 A1 | 9/2007 | Schneider et al. |
| 2007/0219844 A1 | 9/2007 | Santorine et al. |
| 2007/0220435 A1 | 9/2007 | Sriprakash et al. |
| 2007/0271308 A1 | 11/2007 | Bentley et al. |

| | | |
|---|---|---|
| 2007/0271517 A1 | 11/2007 | Finkelman et al. |
| 2007/0282652 A1 | 12/2007 | Childress et al. |
| 2007/0288659 A1 | 12/2007 | Zakarian et al. |
| 2008/0033904 A1 | 2/2008 | Ghielmetti et al. |
| 2008/0034003 A1 | 2/2008 | Stakutis et al. |
| 2008/0059265 A1 | 3/2008 | Biazetti et al. |
| 2008/0059543 A1 | 3/2008 | Engel |
| 2008/0070206 A1 | 3/2008 | Perilli |
| 2008/0071561 A1 | 3/2008 | Holcombe |
| 2008/0126156 A1 | 5/2008 | Jain et al. |
| 2008/0147642 A1 | 6/2008 | Leffingwell et al. |
| 2008/0148193 A1 | 6/2008 | Moetteli |
| 2008/0148346 A1 | 6/2008 | Gill et al. |
| 2008/0154969 A1* | 6/2008 | DeBie .................. 707/200 |
| 2008/0154970 A1* | 6/2008 | DeBie .................. 707/200 |
| 2008/0177790 A1* | 7/2008 | Honwad ............. 707/104.1 |
| 2008/0195597 A1 | 8/2008 | Rosenfeld et al. |
| 2008/0209338 A1 | 8/2008 | Li |
| 2008/0229037 A1 | 9/2008 | Bunte et al. |
| 2008/0294674 A1 | 11/2008 | Reztlaff et al. |
| 2008/0301207 A1 | 12/2008 | Demarest et al. |
| 2008/0312980 A1 | 12/2008 | Boulineau et al. |
| 2008/0319958 A1 | 12/2008 | Bhattacharya et al. |
| 2008/0319984 A1 | 12/2008 | Proscia et al. |
| 2009/0037376 A1 | 2/2009 | Archer et al. |
| 2009/0043625 A1 | 2/2009 | Yao |
| 2009/0064184 A1 | 3/2009 | Chacko et al. |
| 2009/0094228 A1 | 4/2009 | Bondurant et al. |
| 2009/0100021 A1 | 4/2009 | Morris et al. |
| 2009/0106815 A1 | 4/2009 | Brodie et al. |
| 2009/0119677 A1 | 5/2009 | Stefansson et al. |
| 2009/0150168 A1 | 6/2009 | Schmidt |
| 2009/0150866 A1 | 6/2009 | Schmidt |
| 2009/0150906 A1 | 6/2009 | Schmidt et al. |
| 2009/0193210 A1 | 7/2009 | Hewett et al. |
| 2009/0241054 A1 | 9/2009 | Hendricks |
| 2009/0249179 A1 | 10/2009 | Shieh et al. |
| 2009/0249446 A1* | 10/2009 | Jenkins et al. .................. 726/3 |
| 2009/0254572 A1 | 10/2009 | Redlich et al. |
| 2009/0287658 A1 | 11/2009 | Bennett |
| 2010/0017756 A1 | 1/2010 | Wassom, Jr. et al. |
| 2010/0050064 A1 | 2/2010 | Liu et al. |
| 2010/0070315 A1 | 3/2010 | Lu et al. |
| 2010/0088583 A1 | 4/2010 | Schachter |
| 2010/0251109 A1 | 9/2010 | Jin et al. |
| 2011/0191344 A1 | 8/2011 | Jin et al. |

OTHER PUBLICATIONS

Cohasset Associates, Inc., "Compliance Requirements Assessment, IBM DB2 Records Manager and Record-Enabled Solutions", pp. 1-54, Oct. 31, 2004, Chicago, IL.* www.pss-systems.com; retrieved from www. Archive.org any linkage dated Dec. 8, 2005, 130 pages.

PSS Sytems, Inc., Atlas LCC for Litigation, pp. 1-2, www.pss-systems.com (Feb. 2008); PSS Systems, Inc., Map Your Data Sources, www.pss-systems.com (Feb. 200*); PSS Systems, Inc., "PSS Systems Provides Legal Hold and Retention Enforcement Automation Solutions for File Shares, Documentum, and other Data Sources" (Feb. 2008).

PSS Systems, Inc., Preservation Benchmarks for 2007 and Beyond, www.pss-systems.com, pp. 1-3 (2007).

PSS Systems, Inc., "Industry Leader PSS Systems Launches Third Generation of Atlas Legal Hold and Retention Management Software", pp. 1-2, www.pss-systems.com (Aug. 2007).

PSS Systems, Inc., Litigation Communications and Collections, www.pss-systems.com (2006), retrieved online on Dec. 8, 2010 from archive.org, 1 page.

Zhu, et al.; "Query Expansion Using Web Access Log Files"; Lecture Notes in Computer Science, 2005, vol. 3588/2005, pp. 686-695, Springer-Verlag Berlin Hedelberg.

Human Capital Mangement; "mySAP . . . management"; retrieved from archive.org Aug. 18, 2009 www.sap.com.

Cohasset Associates, "White Paper: Compliance Requirements Assessment, IBM DB2 Records Manager and Record-Enabled Solutions", Oct. 2004, 54 pgs.

"HEI Records Management: Guidance on Developing a File Plan", JISC infoNet, Jan. 2007, 7 pgs.

Lewis "Digital Mountin—Where Data Resides—Data Discovery from the Inside Out", available at http://digitalmountain.com/fullaccess/Article3.pdf accessed Mar. 13, 2012, Digital Mountain, Inc., 2004, 5 pgs.

Sears "E-Discovery: A Tech Tsunami Rolls In", available at http://www.krollontrack.com/publications/ediscoverybackgroundpaper.pdf, accessed Mar. 13, 2012, National Court Reporters Association, Apr. 2006, 7 pgs.

* cited by examiner

Select a file to upload

My Documents\contracts\crtct101.pdf  [Browse]

Choose a record type

By business document type
- Form 1 (HR104 Contracts)
- Form 1 (ADM 101 Requisition forms)
- Hiring Contract
- Resume
- PTO request By record category Corporate
└ HR
  ├ HR 104 Contracts
  └ HR 105 Employee submitted
└ ADM
  └ ADM101 Requisition forms

[Proceed]

METHOD AND APPARATUS FOR PROPAGATION OF FILE PLANS FROM ENTERPRISE RETENTION MANAGEMENT APPLICATIONS TO RECORDS MANAGEMENT SYSTEMS

BACKGROUND OF THE INVENTION

1. Technical Field

The invention relates to records retention and record management. More particularly, the invention relates to records retention policy management, record management, and enterprise integration.

2. Description of the Prior Art

Corporations use Records Management Systems (RMSs) to fulfill their obligations in preservation of important company records for regulatory compliance and electronic discovery for litigation. Historically, RMSs evolved as departmental solutions where record classification and disposition policies were set up and maintained locally at the RMS system instance level. Development of retention policies was perceived as a simple task; and RMSs were not designed to support complex workflows in this area.

However, it turned out that departmental solutions do not satisfy corporate needs for the following reasons:

- Departments do not have enough domain expertise to come out with proper retention policies. Retention policy is defined by applicable laws, laws need research, and legal knowledge is not the strength for Line Of Business (LOB) employees.
- There is a tendency to over-preserve evidence which could have been destroyed otherwise when it comes to LOB manager's decisions. This leads to an uncontrolled increase of retention periods, resulting in greater legal and compliance risks and electronic discovery and storage costs.
- When it comes to electronic discovery, legal departments have to know which documents exist at the enterprise. This cannot be achieved reliably without centralized retention policies followed uniformly on LOB level.

To address these issues, corporations started implementing Enterprise Records Management (ERM) applications, such as the Atlas ERM from PSS-Systems. These applications provide a centralized workflow for managing retention schedules for the entire corporation.

After that, corporations faced another challenge: How to propagate record classification and retention information from the ERM to numerous instances of Records Management Systems (RMS) installed across the enterprise.

Before enterprise retention management products appeared on the market, retention schedules were either stored on paper, spreadsheets or stored locally, together with the actual data as a part of RMS setup information. There was no central computerized repository of retention schedules.

SUMMARY OF THE INVENTION

An embodiment of the invention facilitates integration between Enterprise Records Management systems (ERMs) and Records Management Systems (RMSs), thus providing a robust record classification and retention schedule enforcement process in large enterprises. Typically, ERMs have been designed from the ground up to be highly scalable across multiple national and regional jurisdictions, whereas RMS's were primarily departmental. Proper integration between ERMs and RMSs, as provided by the invention, allows corporations to deploy larger scale multi-organizational instances of RMSs, thus achieving a better level of control and significant economies of scale.

BRIEF DESCRIPTION OF THE DRAWINGS

FIG. 10 is a block schematic diagram that shows an imaginary user interface for record declaration where a user is given an option to classify the record according to a Business Alias, in addition to using a conventional method of classification by record category, according to an embodiment of the invention.

DETAILED DESCRIPTION OF THE INVENTION

Record Management Terms

Figure 1:
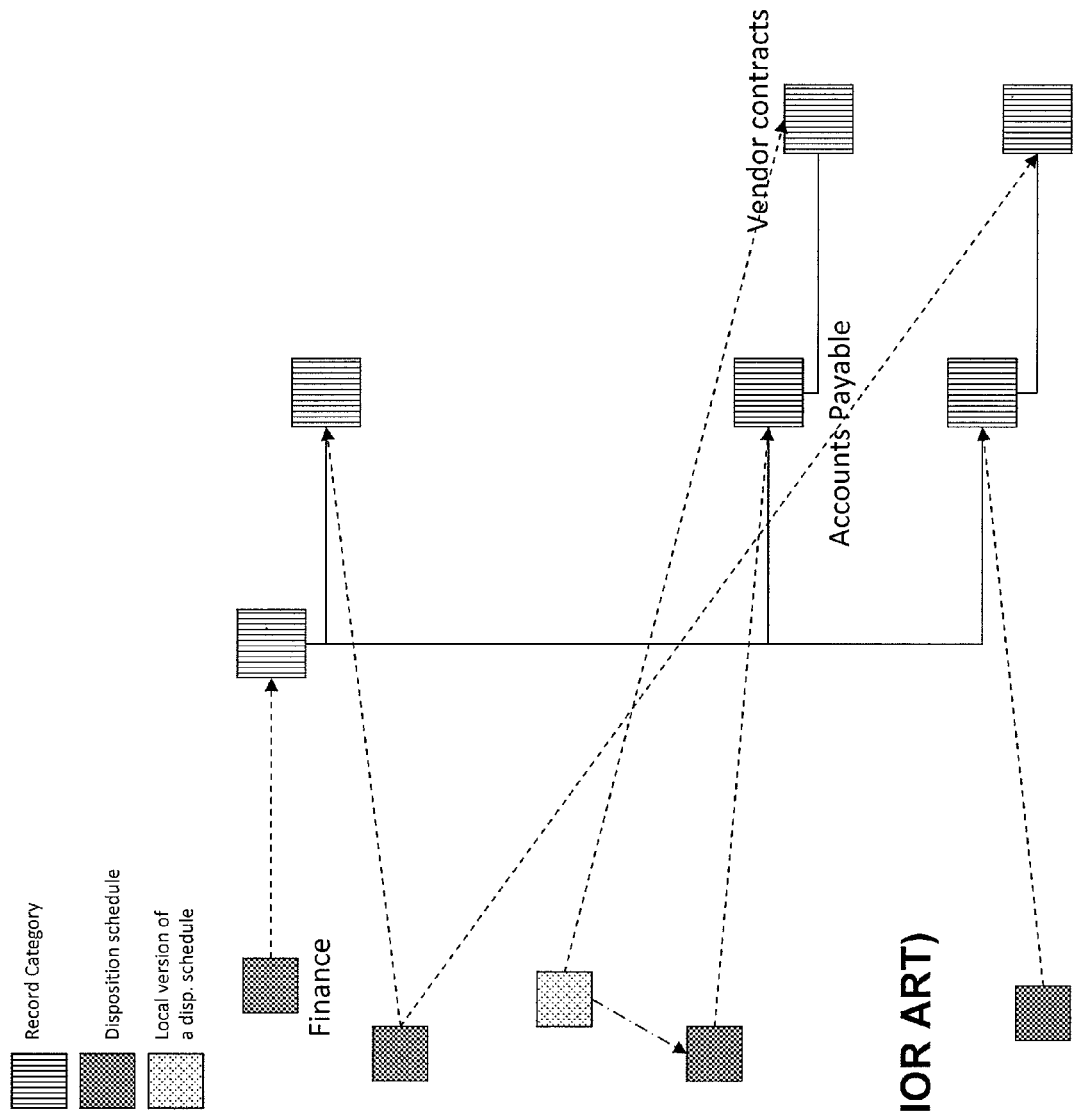
FIG. 1 is a block schematic diagram that shows a record classification hierarchy in a typical RMS.

In general, the entities listed below constitute the hierarchy of records and related metadata. See FIG. 1 for an illustration of their relationships.

Record. For the purpose of this discussion, Records are immutable documents with associated metadata, which need to be preserved for a certain period of time to meet companies' external (or internal) regulatory obligations.

Records Management System (RMS). An RMS is a system which is designed to store Records. Usually, this is a layer on top of an Enterprise Content Management system.

Record Category hierarchy. This is a hierarchy of record categories set up within an RMS. When a Record is created, it needs to be associated with a node in this hierarchy. A records category tree is usually (but not always) structured by a business function/sub-function, e.g. "Corporate->Finance->Accounts Payable->Vendor contracts."

Disposition schedule (DS). A DS is a set of rules in an RMS which describes when to dispose of the Records. A disposition schedule consists of the following parts: triggering events, i.e. events that trigger the start of retention period counting, e.g. employee termination event starts a four-year retention period for employee-related records; disposition type, e.g. destroy the record automatically once the retention period is over vs. start a manual disposition review process vs. move a document to another archive etc.; and retention period. DSs are associated to Records categories directly or indirectly, e.g. by inheriting the schedules from parent record categories, or can be associated to a record or a collection of records.

Classification (Act of classifying) of a record. When a document is declared as a record, it needs to be "Classified," i.e. associated with a node of a Record Category hierarchy. Once this is done the RMS knows which disposition schedules should be applied to a given record.

Triggering event types. Retention periods are associated with triggering event types. For example, there may be a retention rule "Destroy the record in four years after employee termination," where "employee termination" is an event type. Or, there may be a rule "Destroy a record in five years after record declaration," where record declaration is an event type. Events (instances of Event Types) may be communicated to an RMS in various ways. For example, an RMS may consider an "Employee termination" event happened if the "termination_date" metadata field associated with a given record changes from NULL value to some date value. Or, an RMS may expect an event to be communicated directly to it by an external application through an API.

File Plan. Within the RMS, the File Plan is a combination of a retention category tree, disposition schedules, and events, which defines how records are stored and disposed of in a given RMS. Also, a File Plan can be understood as some kind of external document which guides how to set up RMS File Plans.

Enterprise Retention Management Terms

Figure 2:
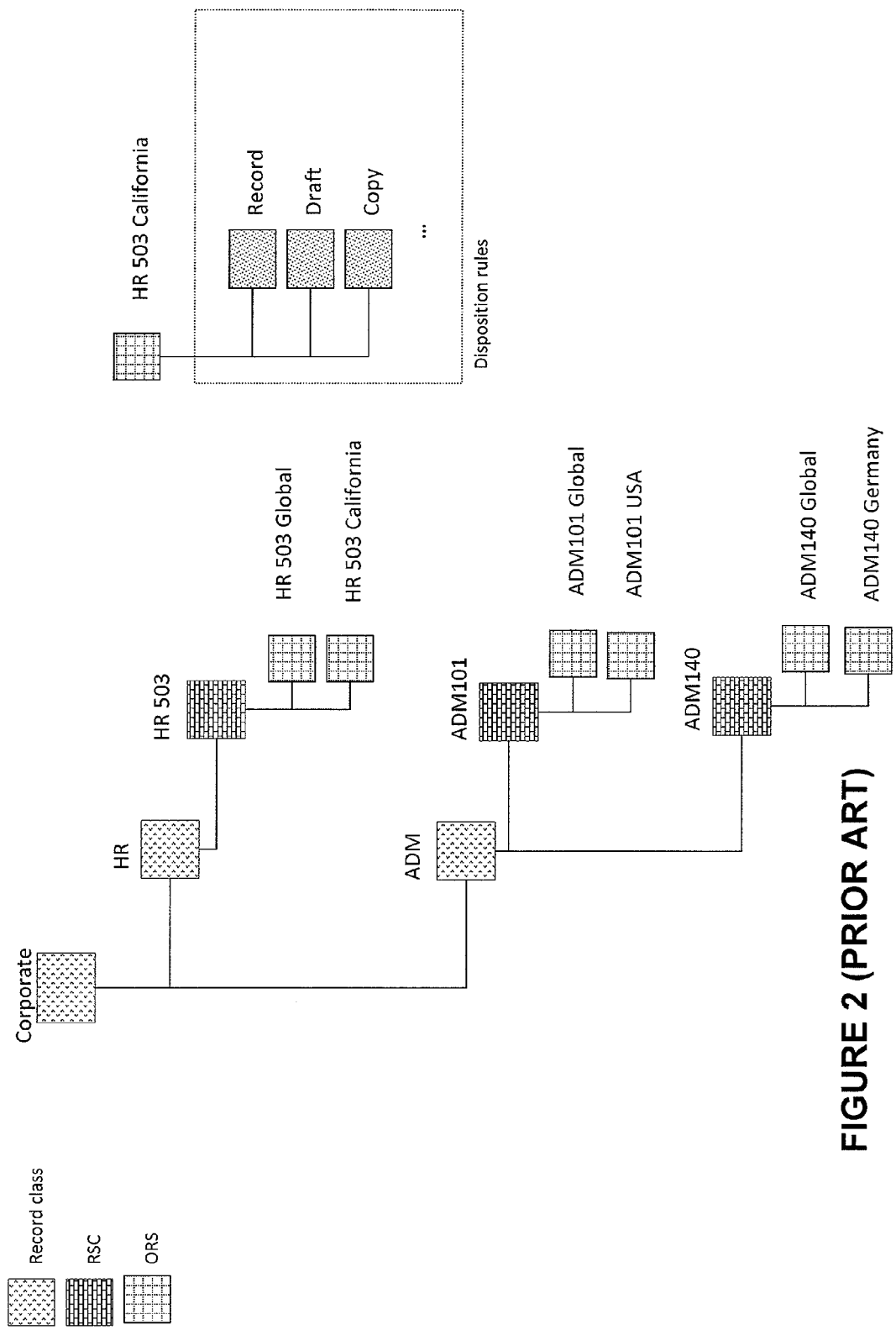
FIG. 2 is a block schematic diagram that shows a retention classification hierarchy in a typical ERM.

In general, the entities described below constitute the classification and metadata of retention (disposition) policies, not records. See FIG. 2 for an illustration of their relationships.

Although business domains of RMSs and ERMs overlap significantly, the terms they use are somewhat different. This is partially caused by different data models of ERMs and RMSs and partially by the need to solve different business problems.

Record class. This is a hierarchy similar to "Record Categories" in an RMS, structured by business function. However there are a few differences:

This tree is Global, e.g. it spans across the entire corporation, as opposed to a record category tree which maybe relevant only to a given instance of RMS.

This tree defines a higher level of business function (in our example this may be Corporate>Finance). The lower levels are defined differently.

Note that this tree defines classification of retention schedules as opposed to records (in case of RMS).

Organizational hierarchy. This is the hierarchy of corporate organizational units, e.g. "Corporate->Americas->USA->California->Branch 234" or "Bank Corporation 1->Bank XYZ->California->Investment Banking." Organizational hierarchy usually takes into account geography, corporate entity, and business function.

Organization-Specific Retention Schedule (ORS). These are rules on how to dispose certain types of documents, which are specific to a jurisdiction or internal regulations and are typically associated with an organizational unit. For example, there may be a Corporate-wide ORS for vendor contracts which is applied to all business units dealing with vendor contracts within Finance->Accounts Payable. And, there may be a California-specific ORS which requires vendor contracts to be stored for a longer period of time. The latter ORS applies to all the business units including and below California.

Usually, ORSs are defined on different levels of organization, so that an ORS on a lower level serves as exception to ORSs defined on a higher level. If there is no exception, the higher level ORS is inherited on a lower level of organization. There may be mechanisms of associating an ORS with a particular organization other than inheritance.

Retention schedule code (RSC). This is an aggregation of ORSs which guides the retention for the same type of documents in different organizations within a company. For example, all ORSs that describe vendor contracts in Corporate->Finance->Accounts Payable are united under a single RSC "FAPV-121."

In addition to being an aggregator, an RSC may serve as a template for ORSs, e.g. defining default values. In this case, it makes sense to refer to them as Retention Schedule Templates, but from an RMS integration viewpoint template functionality is not relevant. In fact, an ERM may let the users define the hierarchy of Retention Schedule Templates that serve as templates for various organizations.

Figure 3:
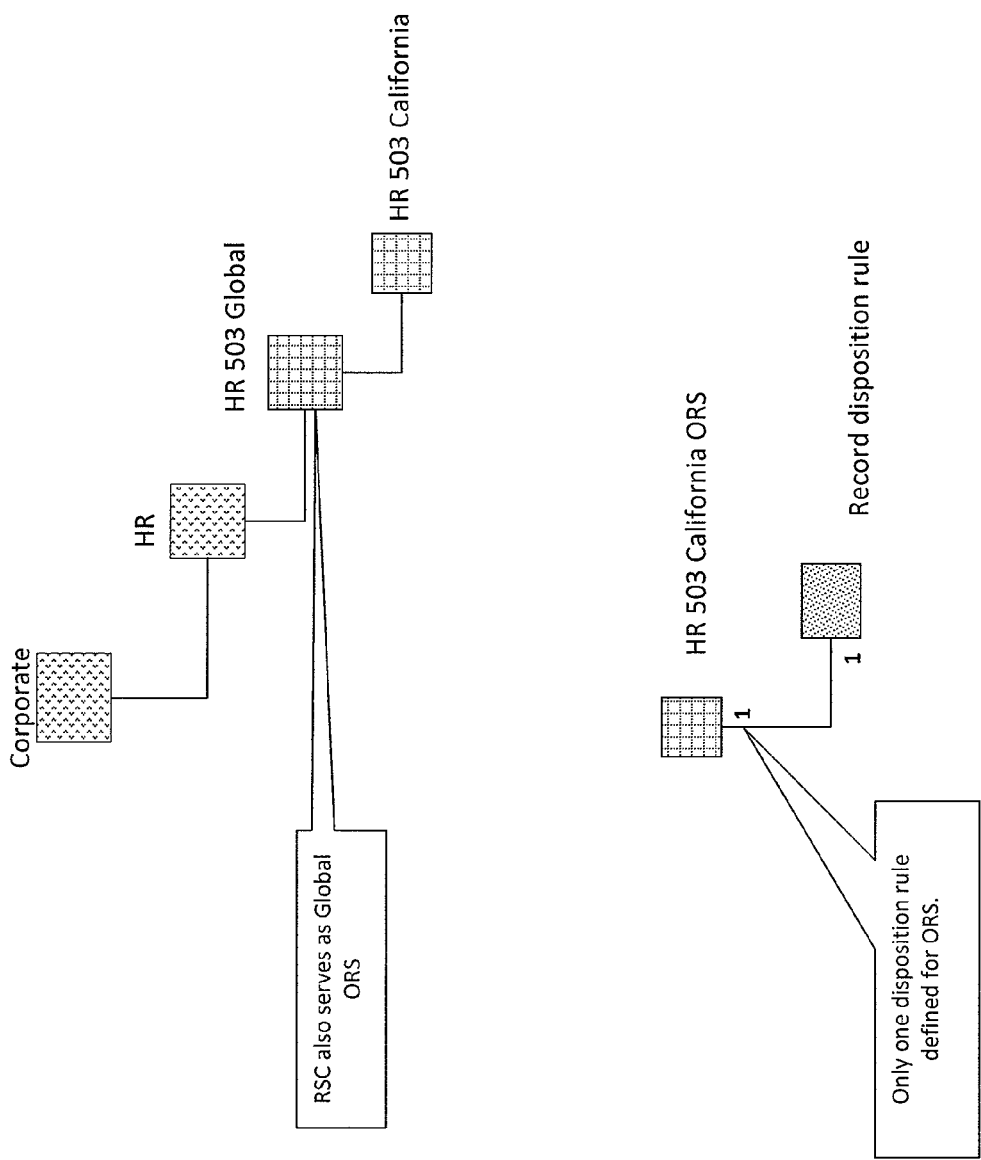
FIG. 3 is a block schematic diagram that shows a number of design alternatives for an ERM retention classification hierarchy.

Note that in certain ERMs, an RSC and a corporate level ORS may be the same entity. See FIG. 3.

Disposition rule. A Disposition Rule is an object describing how and when the document can be disposed of. This is a combination of rule type ("event+time based" vs. "event based" etc.), event type (e.g. employee termination), retention period (e.g. five years) and possibly disposition type (dispose automatically vs. review and dispose etc.) which define the rules of retention for a given ORS. Event type and retention period may be not required for certain rule types. For example, rule type "forever" requires neither event type nor retention period.

Disposition rules are associated with (or are a part of) ORSs. In one embodiment, the same rules may be associated with more than one ORS. Because ERM may describe retention/disposition not only for the records but for non-record documents (such as drafts, copies, etc.), a single ORS can define more than one disposition rule. See FIG. 3.

Note that if an ERM defines only the disposition rules applicable for records (as opposed to copies and drafts), a disposition rule object and ORS may be merged into a single entity.

Business Alias. A Business Alias is a business classification of documents that allows LOB users to perform a record declaration of search without knowing the record class or RSC or ORC IDs/names. A Business Alias can operate with names recognized from their day-to-day business practice. Business Aliases are typically associated with local schedules and (depending on the design of ERM) with data source records in ERM. Data source records point to instances of an RMS.

Data Source. A Data Source is an entry in ERMs database describing a particular instance of information system where data is stored. In case of integration with an RMS, an instance of RMS may be presented in an ERM as a data source.

EMBODIMENTS OF THE INVENTION

Top Down Policy Propagation Mechanism Between RMS and ERM

The ERM is always a source of master data about record classification and record retention. All the maintenance of record classes and retention/disposition rules is performed in the ERM. Once information is prepared and approved it gets propagated to the RMS to set it up.

Information can be propagated in an automatic way by the virtue of a software connector between ERM and RMS, in a semi-automated way where user can export the File Plan information from ERM in a form understood by RMS import tools, or in a manual way. As a part of a data propagation process of any kind, the ERM presents an end user with a view of ERM objects (Record classes, RSCs, ORSs, disposition rules) translated into an RMS language (record classes, disposition schedules, events) to allow the end user to perform manual setup for an RMS.

Figure 4:
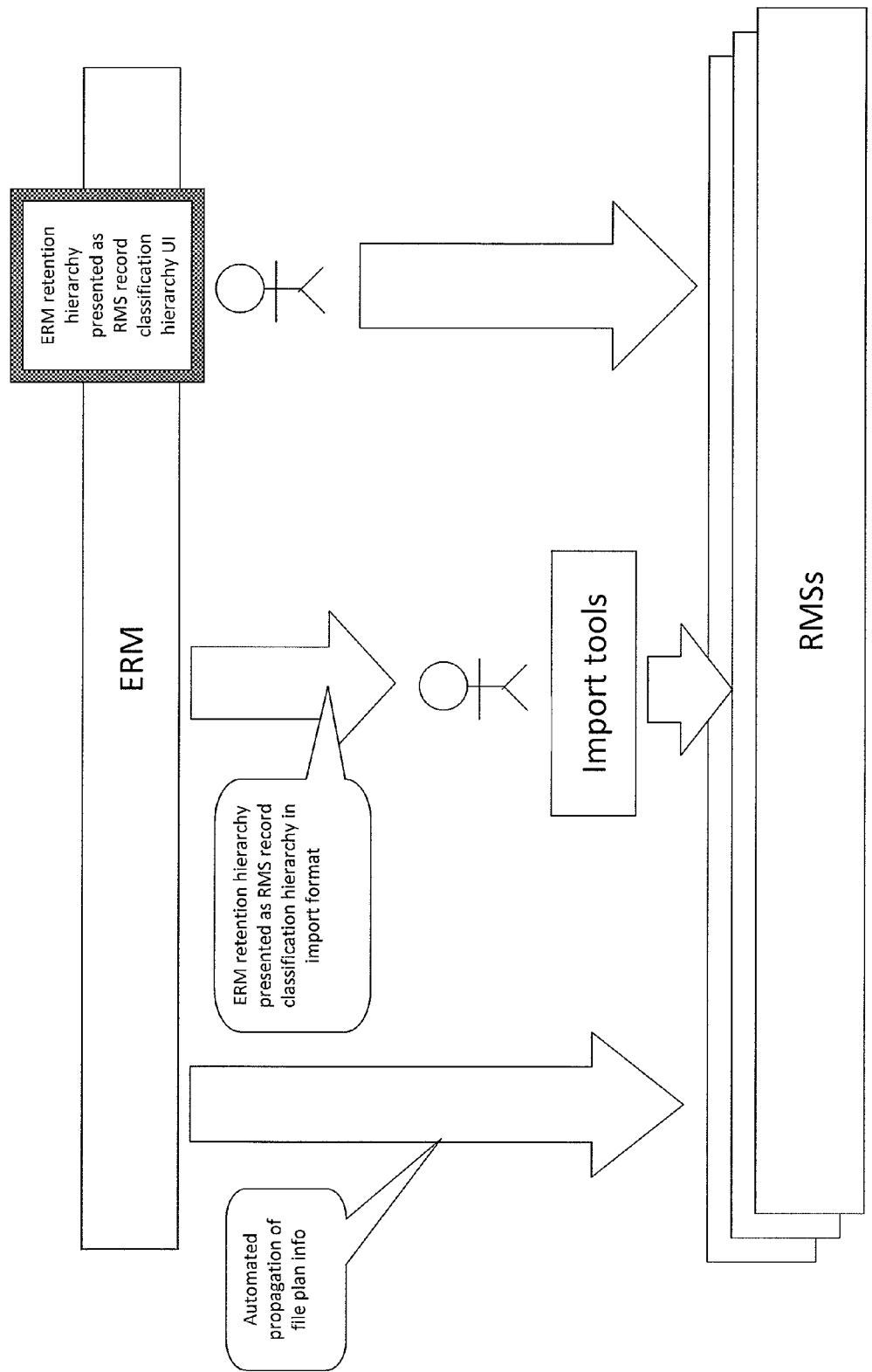
FIG. 4 is a block schematic diagram that shows mechanisms for communicating file plan information from an ERM to an RMS.

See FIG. 4.

Translation between Record Categories in RMS and Record Classes, RSCs and ORSs in the ERM Data models in RMSs and ERMs differ greatly when it comes to integration, although they often describe similar set of real life objects. To communicate File Plans from ERM to RMS, the ERM must convert an object graph defined in the ERM into a set of entities understood by the RMS.

Major challenges in this regard include:
ERM record class hierarchy is a hierarchy of retention schedules, whereas RMS record category hierarchy is a hierarchy of records.
The RMS treats disposition schedules orthogonally to record category hierarchy. The same schedule can be applied to a set of totally unrelated record categories. Whereas the ERM provides a taxonomy of retention schedules where a retention schedule may belong to only one parent.
The RMS can place records in any level of record category hierarchy whereas: a) the ERM does not have a notion or Record; and b) the ERM does not define retention rules for high level nodes of record class hierarchy.

It is possible to provide a number of different mappings, each of them has its advantages and disadvantages. For example it is important for usability not to merge an organizational tree maintained by an ERM into a File Plan because this significantly complicates the usage of the RMS.

Figure 5:
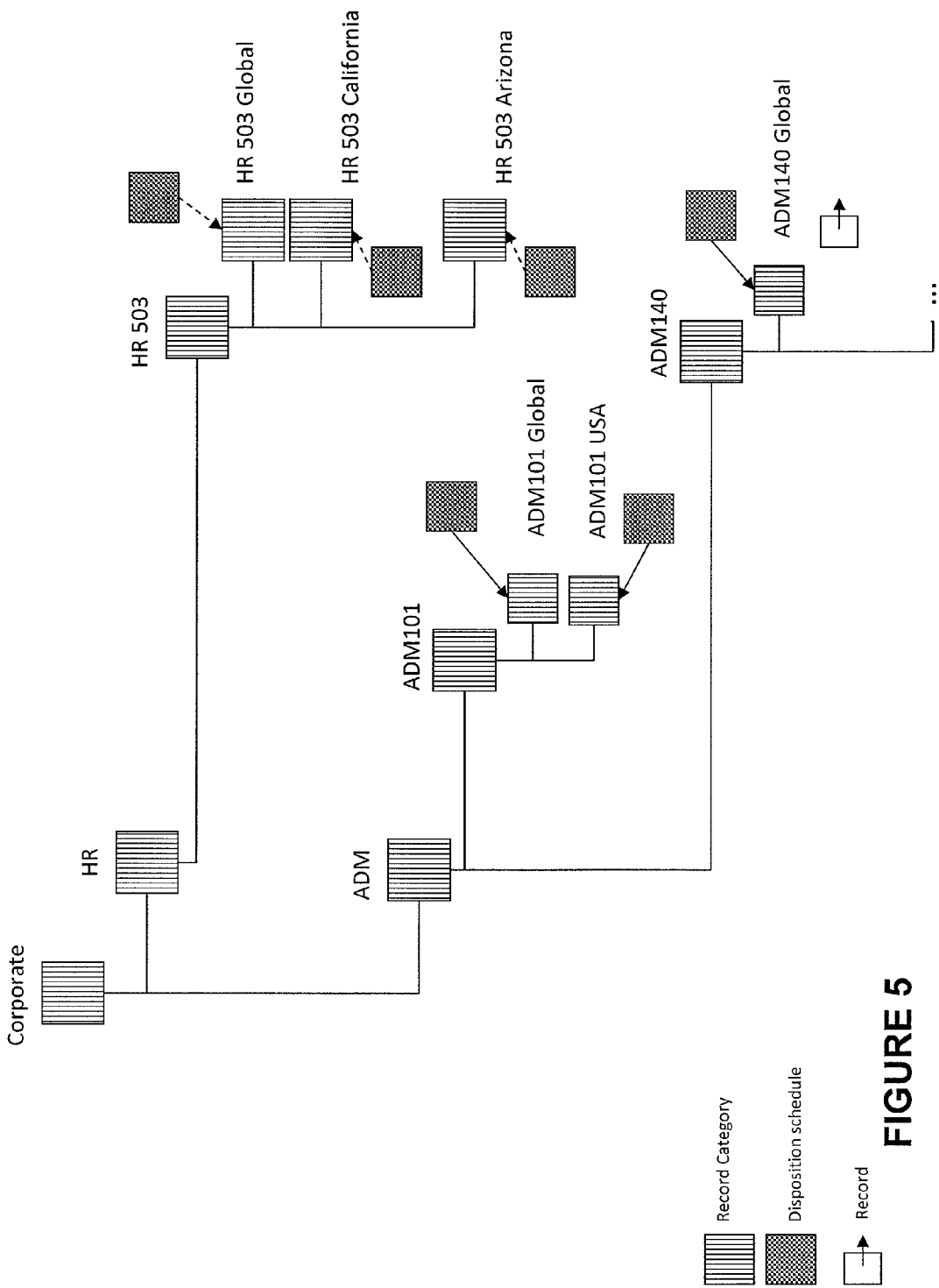
FIG. 5 is a block schematic diagram that shows how a retention classification hierarchy displayed in FIG. 2 is translated into a File Plan according to an embodiment of the invention.

The following translation between ERM and RMS objects shows presently preferred embodiments of the invention:

Mapping #1
ERM Record Classes are translated to RMS Record Categories.
ERM RSCs are translated into next level Record Categories under those created from Record Classes.
ERM ORSs are translated into next level(s) Record Categories under those created from RSCs.
ERM disposition rules associated with ORSs are translated into RMS disposition schedules. Only the disposition rules applicable to records (as opposed to drafts or copies) are taken into account. Disposition schedules are attached only to ORS-based record categories.
ERM event types are mapped to RMS event types.
Records are stored only under the bottom level records category (ORS level). Note that records may be stored inside some record specific containers, such as folders, volumes, etc. But, they cannot be stored under the category which has child categories because such a category will not have disposition rules associated with it.
See FIG. 5.
Note that if a particular ERM allows for a hierarchy of RSCs (global vs. country specific RSCs), all the hierarchy are flattened into one RCS related Record Category. RSC hierarchy is useful for retention policy authoring, but it has no value for records management.

Mapping #1.1
If the disposition rule and ORS are the same entity for a particular ERM, during the translation, the ERM creates two RMSs objects, i.e. a bottom level record category and a disposition schedule associated with it.

Mapping #1.2
If for a certain ERM, a top level ORS and RSC is the same entity, the ERM creates two levels of Record category objects: one to represent a notion of RCS (referred to herein as an RSC record category), and one to represent a top level ORS. All local ORS record categories belong to an RSC record category.

Mapping #2
The difference between Mappings #1 and #2 is lack of RSC (or hierarchy of RSCS) in Record Category mapping. Because users are always expected to see their local ORSs, and those who do not have a local ORS use a top level corporate ORS, there may be no practical need to expose RSC as a record category.

Figure 6:
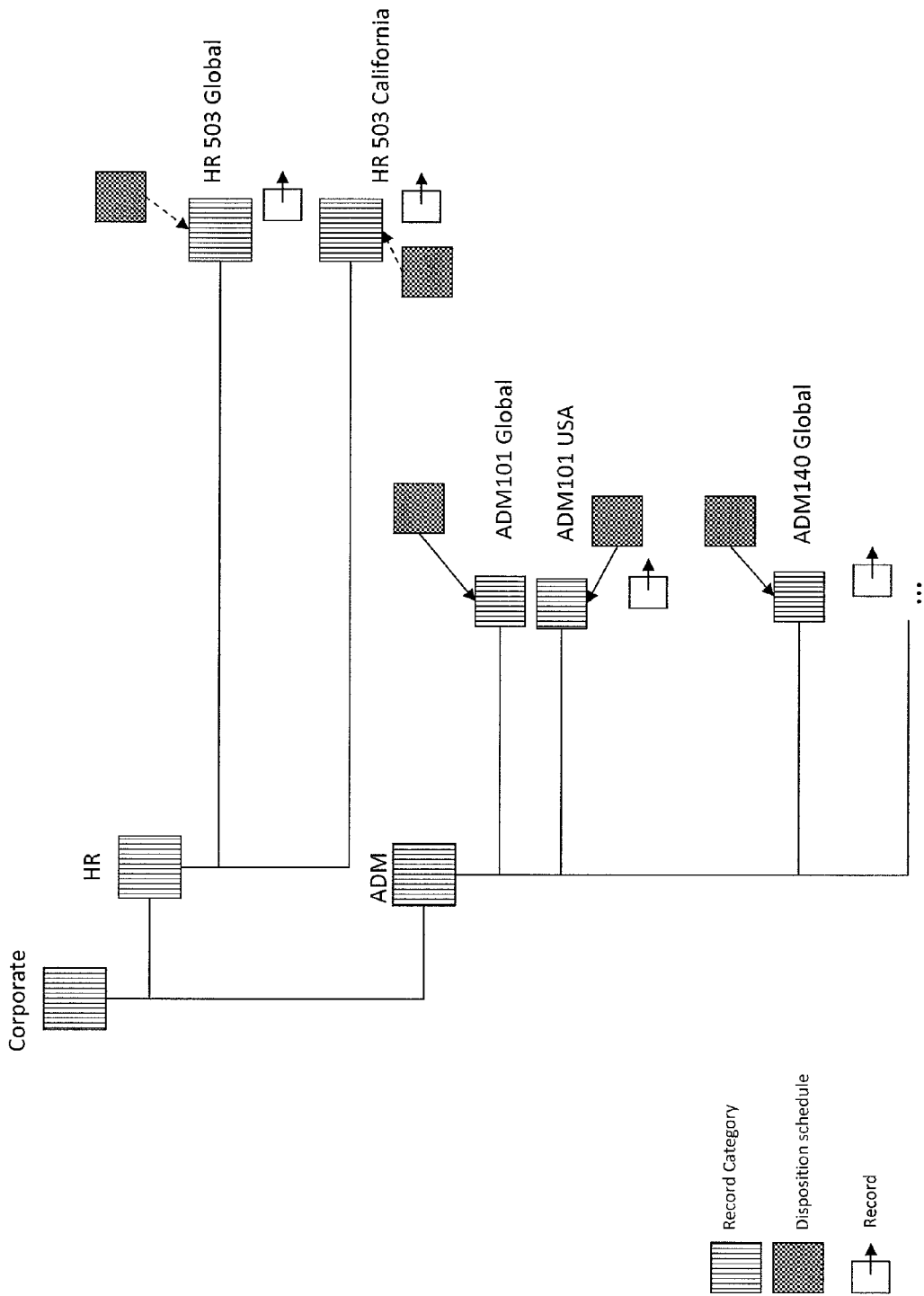
FIG. 6 is a block schematic diagram that shows an alternative way of translating a classification hierarchy into a File Plan according to another embodiment of the invention.

See FIG. 6.

To summarize, in connection with the presently preferred method for determining the mappings discussed above:
It is assumed that it is fine from a business viewpoint to define Disposition Schedules only on the bottom-most level of a record category hierarchy in the RMS. If there is a need to associate a record with a higher level of hierarchy, e.g. "Finance->Accounts Payable," the RMS can always define an explicit record category for that, e.g. "Finance->Accounts Payable->Other" and define a disposition schedule for it.
This results in one-to-one relationship between bottom-most level of record category hierarchy in the RMS and bottom-most level of retention schedule hierarchy in the ERM (which is ORS).
Because higher-level nodes of record category hierarchy in the RMS closely resemble Record Class nodes in the ERM, it is assumed that Record Classes can be directly translated into Record Categories.
From an ERM viewpoint, two disposition rules with equal retention periods, event types, and disposition types are not the same if they are governed by different set of laws. The RMS is primarily interested in enforcing the disposition and, thus, is not concerned about the legal side. Therefore, the RMS allows for reusing disposition schedules across multiple record categories. In spite of this possibility, in proposed mappings such rules are translated into two different disposition schedules.
One-to-one mapping between a bottom-level record category (in RMS) and an ORS (in ERM) makes it possible to claim that, if a data source is associated with a particular ORS, it is associated with a corresponding record category in RMS. Therefore, if there is a business alias associated with that particular data source for a given ORS in the ERM, in the RMS it can be treated as "there is a business alias associated with a particular Record Category." This allows the use of Business Aliases for record categorization and declaration.

RMSs have a rich set of features aimed to facilitate the management of file plans, and the mappings herein do not use many of them, for example:
The ability to associate a disposition schedule with more than one record category;
The ability to associate a disposition schedule with record categories other that leaf records category; and
The ability to define local permutations of a disposition schedule.

The preferred embodiment does not use these features (although the use of them is not inconsistent with various embodiments of the invention) which seemingly makes it less efficient than out of the box functionality of the RMS. However, the inefficiency is more than compensated by:

- A centralized process of policy distribution where users do not need to fine tune file plans on the RMS side and, therefore, can afford less efficient and redundant structure of the File Plan;
- The use of efficient retention policy authoring tools on the ERM side, which compensates for loss of efficiency on the RMS side;
- A more legally sound process when retention rules are defined by applicable laws. Therefore, even the rules which contain similar retention periods and event types, but which are guided by different citations and are treated as different entities, are thus able to evolve separately once legislation changes; and
- Legally defensible retention policies and a process which ensures that they are properly maintained over time.

Propagating and Using Organization Information

ERM systems keep the linkage between ORSs and the organizational nodes to which these schedules are applied. RMS systems do not do this. This becomes a serious deterrent when it comes to implementing a large scale instance of an RMS used by multiple organizations with multiple local requirements for retention of the same record category.

In addition to a File Plan, the ERM propagates the organizational tree structure to the RMS. Only the record categories which map to ORSs have an association with an organizational node.

Figure 7:
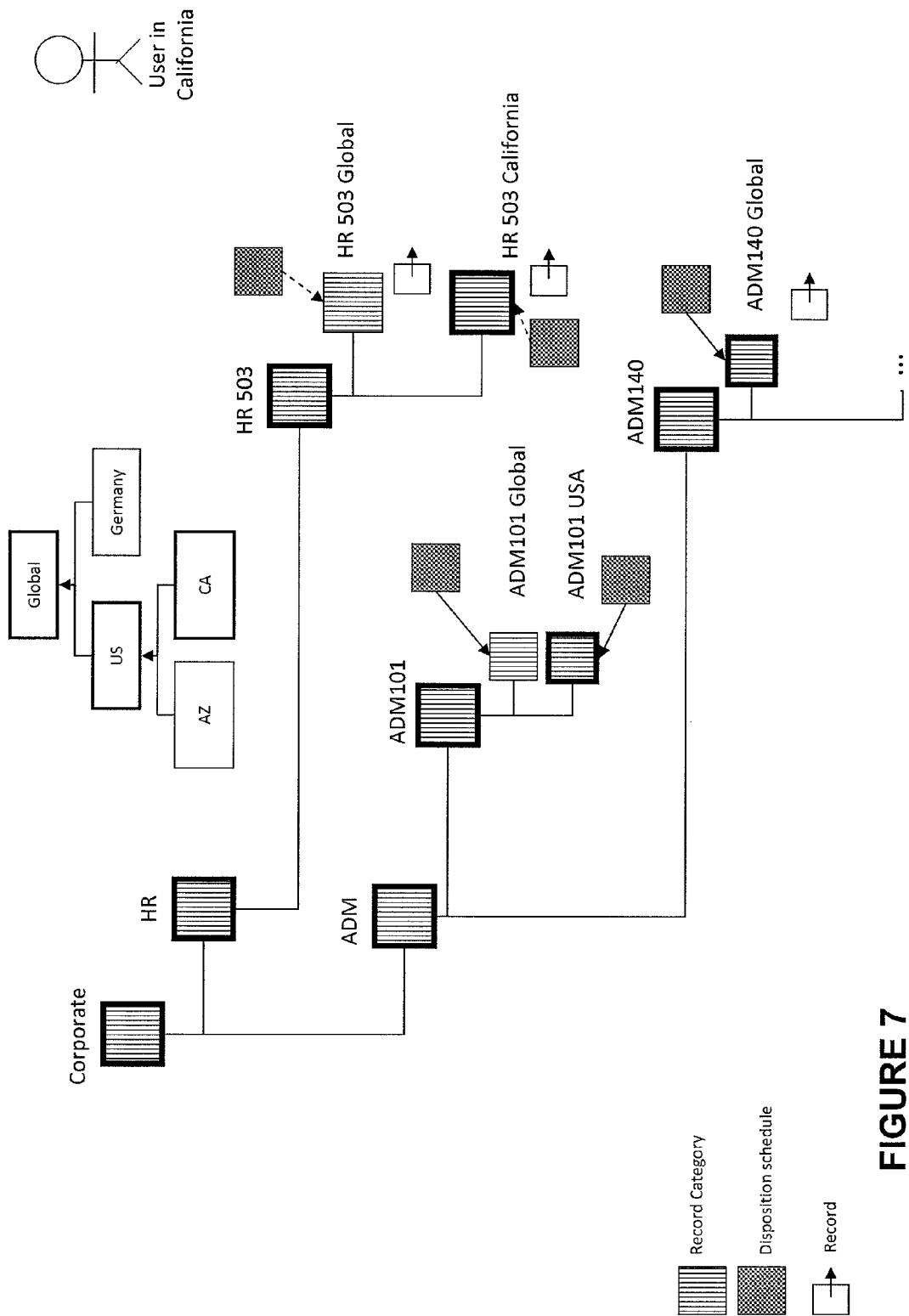
FIG. 7 is a block schematic diagram that shows how organization information is used by an RMS to simplify the view of an RMS records category hierarchy by the end user according to an embodiment of the invention.

See FIG. 7.

By knowing the organizational tree, the RMS can deduce which record categories are relevant to a lower level of the organization if there is no ORS-based records category for it. To achieve that, the RMS:

- Traverses one level up the organizational tree;
- Check if there is any ORS-based record category associated with a parent organization; and
- If not, repeats the foregoing operations until such a category is found or the top level of organization tree is reached.

By having this information, the RMS can reconcile between a user's organization and the organization local schedule that belongs to the user's organization. For example, when user tries to declare a record, the RMS UI provides him with only the record categories applicable to user's organization. If there is no such a category, the RMS provides him with record categories created from the ORS belonging to ancestor nodes in the organizational structure. In this way, a complex corporate level tree of record categories can be exposed as a relatively small sub-tree view applicable to the user.

Figure 8:
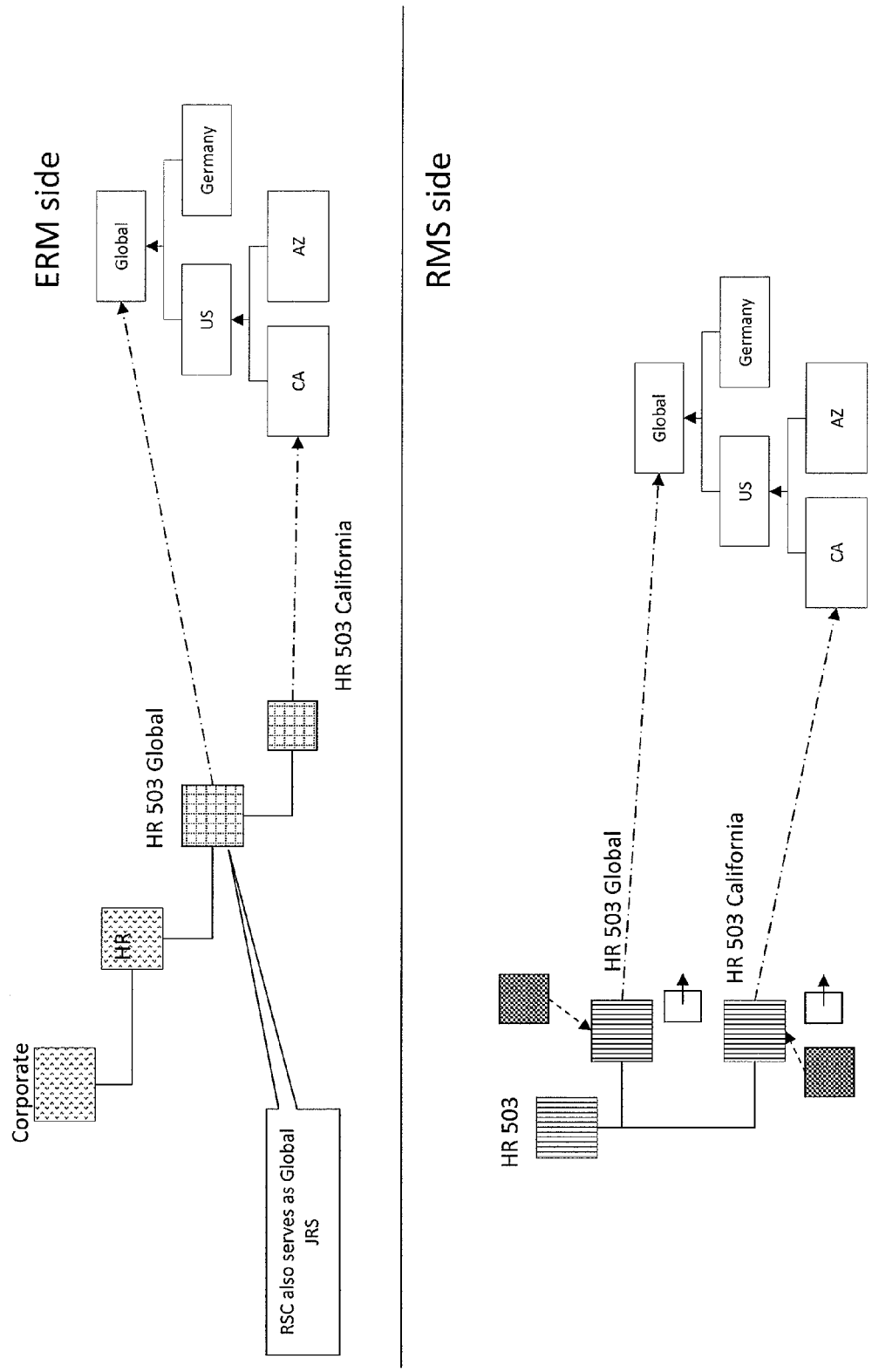
FIG. 8 is a block schematic diagram that shows how to translate an ERM retention hierarchy into RMS record categories when, according to ERM design, a top level organization-specific retention schedule (ORS) is merged with a retention schedule code (RSC) according to an embodiment of the invention.

From an RMS standpoint, the organizational tree is kept independent from the Record category tree. If according to ERM design, the RSC plays the role of top level ORS, this is presented to the RMS as an ORS level record category associated with top level organizational node. See FIG. 8.

Without filtering by organization, RMSs are not able to scale well for large organizations in spite of the fact that this is achievable from a hardware standpoint. It is unrealistic to expect from a business user to navigate across thousands of record categories.

Creating a Subset of a Corporate File Plan Applicable to a Given Instance of an RMS It is overly complex and confusing to communicate the entire corporate record category tree to each and every instance of the RMS. Usually, an enterprise contains multiple instances of the RMS, each of which is interested in a narrow subset of record categories.

The ERM can determine which instances of RMS contain the records that belong to certain ORSs by querying the data in its own database which describes an association between the data source records and the ORS records.

Various designs of ERMs may store these associations differently. For example, the Atlas ERM does not have a direct association between a data source and an ORS. Instead, it has a notion of a Business Alias which describes what business categories of documents belonging to a particular ORS reside in which data source. Therefore, the fact that a data source must know about a particular ORS can be derived from a query: "select all ORS, which is pointed to by a Business Alias, which belongs to a given data source."

Other ERMs may store direct associations between a data source and an ORS. The way the ERM derives the association between a data source and a ORS is irrelevant for the discussion of the invention herein.

Once the list of ORSs is defined, the ERM can traverse up to their RSCs, then up to record classes, thus identifying a subset of the overall record categorization hierarchy.

Figure 9:
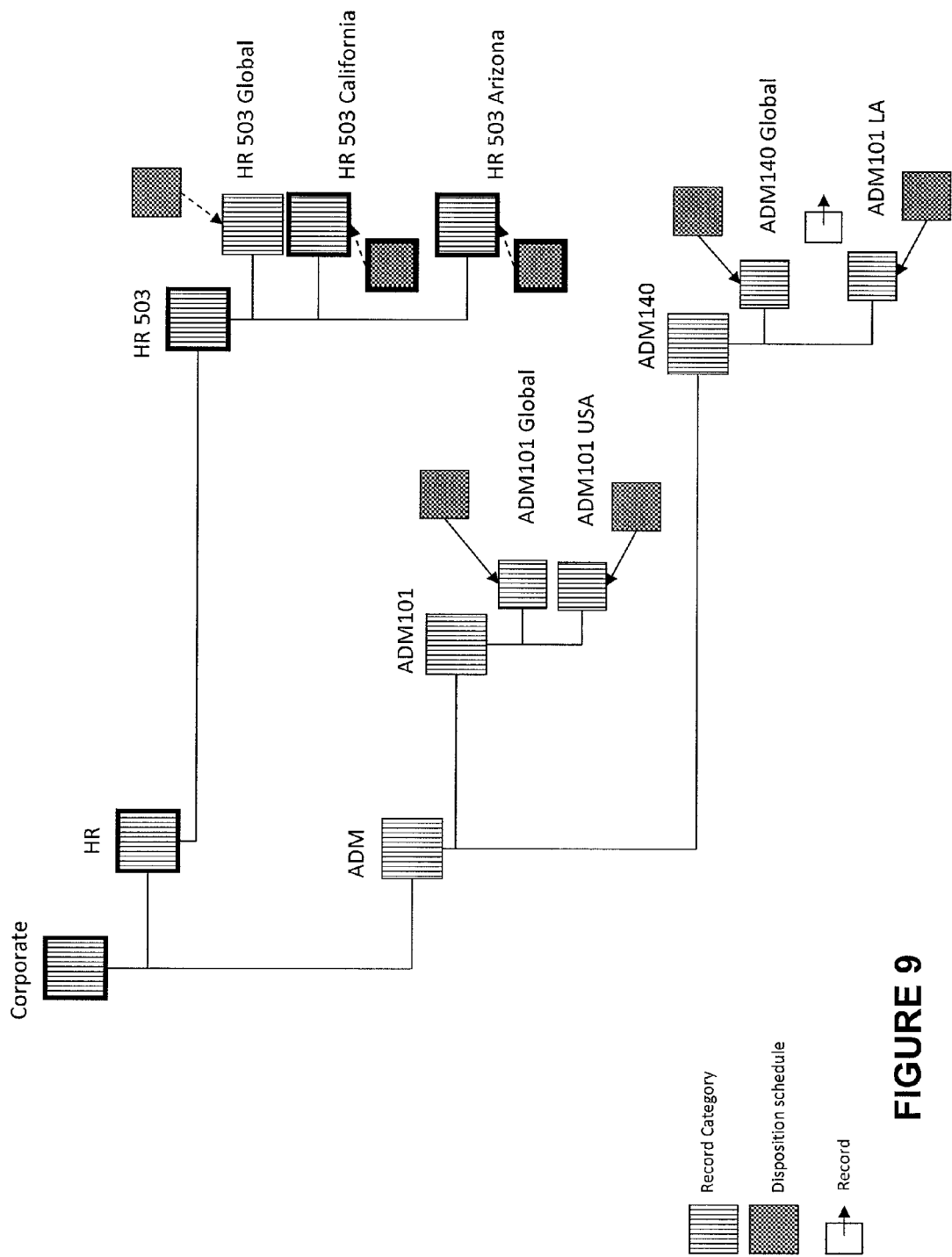
FIG. 9 is a block schematic diagram that shows the subset of a File Plan filtered by a data source to ORS associations which are communicated to an RMS according to an embodiment of the invention.

In FIG. 9. an example of a retention classification sub-tree is shown which is communicated to an HR RMS stores records for the US (marked bold). When communicating with an RMS, this translates into a subset of file plan tree. Note that the ERM passes only those disposition rules and events which are applicable to the given subset of the file plan.

Usually, a large corporation has a large number of RMS instances installed. Each maintains its own file plan. In such an infrastructure, it becomes impractical to pass the entire file plan from many perspectives, e.g.:

- Simplicity. RMSs are often aligned with business functions. Users of RMSs are typically involved in the creation of a small subset of record categories. Exposing the rest of categories results in more confusion and increased probability of error.
- Security. Business users are not necessarily allowed or encouraged to know all the record structure of their enterprise. Also, maintaining a set of unnecessary record categories creates a burden of managing more complex sets of user access permissions.

Therefore, filtering only the relevant part of a record category tree is an essential part of the overall solution, making it possible to integrate in multi-RMS environments.

Using ERM Business Aliases to Simplify Record Search and Declaration

Business Aliases and their associations with ORSs are communicated to the RMS. This allows the RMS to provide a more convenient record declaration and search user interface. When users of the RMS perform record declaration or search through the RMS UI, they do not need to know the record category or ORS name any more, e.g. HUM101. Instead, they can choose a familiar Business Alias, e.g. Food Purchasing Contracts. Together with filtering of record category tree by organization described above, this provides a very clear and error safe UI to the LOB. Also, this minimizes the amount of communication between LOB users and records management professionals, and reduces potential for confusion.

When ingesting records through other applications, e.g. the MS Outlook client, these Business Aliases can be communicated to these applications. This allows the user of the application to classify the record easily. For example, in the MS Outlook client user sees a list of "document type" folders. Once the email is dragged into such a folder, an ingestion software has enough information to classify the document as a record belonging to a certain record category. Alternatively, such an UI can be implemented as tags. Once a user tags an email, it gets ingested and declared as belonging to a certain record category of an RMS instance.

Alternatively business aliases can be exposed as folders or tags in legacy record migration tools. A consultant who executes a legacy data classification task can drag the files into one of such folders, which results in a migration tool classifying the document as belonging to a certain record category.

Because business aliases are not required to be unique across the ERM, there may be a situation when multiple ORSs have business aliases with the same name, e.g. Form #1. To disambiguate the user (and possibly a record ingestion software), aliases can be:

Grouped into a hierarchy where Record Category names or identifiers are presented as parent nodes of the hierarchy; and/or Prefixed (or suffixed) with records category name or identifier always or whenever ambiguity exists.

FIG. 10 shows the screen of a record declaration software which uses business aliases to facilitate the choice of record category (left part of a screen) and a conventional method of exposing the record category tree (right part of a screen).

The regulatory burden on corporations only increases with time. This means that more business users need to be familiar with record management operations (at least record declaration). Under these circumstances it becomes very important to:

Simplify the learning curve. Let business users operate in terms they already familiar with;

Minimize probability of errors; and

Minimize the amount of costly communication between RM professionals and business users when instructions are not clear This embodiment goes long way in achieving these goals.

Machine Implementation

Figure 11:
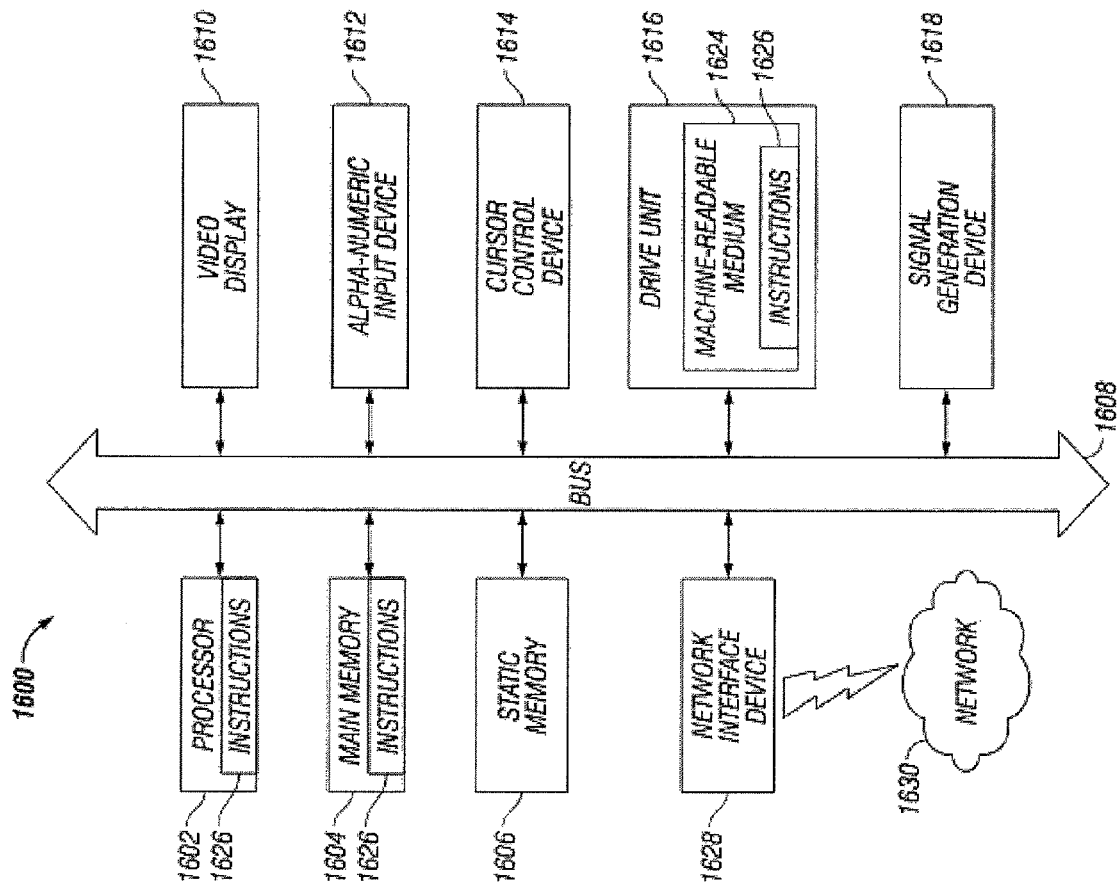
FIG. 11 is a block schematic diagram of a machine in the exemplary form of a computer system within which a set of instructions may be programmed to cause the machine to execute the logic steps of the invention.

FIG. 11 is a block schematic diagram of a machine in the exemplary form of a computer system 1600 within which a set of instructions may be programmed to cause the machine to execute the logic steps of the invention. In alternative embodiments, the machine may comprise a network router, a network switch, a network bridge, personal digital assistant (PDA), a cellular telephone, a Web appliance or any machine capable of executing a sequence of instructions that specify actions to be taken by that machine.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1620.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1628, 1630 by means of a network interface device 1620.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complimentary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer implemented method for propagation of file plans from an enterprise retention management system (ERM) to one or more records management systems (RMS), the method comprising:

providing a processor-based RMS that is configured to store a plurality of records which need to be preserved for a certain period of time to meet companies' regulatory obligations, the records comprising documents with associated metadata;

providing a processor-based ERM that is configured as a source of master data about record classification and record retention, the ERM configured to perform maintenance of record classes and retention/disposition rules and to propagate information to the RMS according to any of the following:

automatically via a connector between the ERM and the RMS;

semi-automatically via end user export of file plan information from the ERM in a form understood by RMS import tools; and manually; and wherein the ERM is configured to provide a mapping for translation between ERM and RMS objects to effect propagation of file plans which comprise a combination of a retention category tree, disposition schedules, and events, and which defines how records are stored and disposed of in a given RMS, from the ERM to the RMS, the mapping including:

translating ERM record classes within a classification of retention schedules to RMS record categories within a hierarchy of record categories set up within the RMS, and translating ERM retention schedule codes (RSCs) into next level record categories under those created from record classes.

2. The method of claim 1, wherein:
the ERM is further configured to present said end user with a view of ERM objects translated into an RMS language to allow the end user to perform manual setup for an RMS.

3. The method of claim 1, wherein the mapping further comprises:
translating ERM organization-specific retention schedules (ORSs) into next level record categories under those created from RSCs;
translating ERM disposition rules associated with ORSs into RMS disposition schedules;
mapping ERM event types to RMS event types; and
storing records only under a bottom level records category at an ORS level.

4. The method of claim 1, wherein the mapping further comprises:
creating, by the ERM, a plurality of RMS objects, each comprising a bottom level record category and a disposition schedule associated with said bottom level record category, if there are disposition rules and organization-specific retention schedules for a plurality of entities associated with a particular ERM.

5. The method of claim 1, wherein the mapping further comprises:
creating, by the ERM, two levels of record category objects: one object level representing retention schedule codes (RSC record category) and one object level representing a top level organization-specific retention schedule (ORS) if for a certain ERM, a top level ORS and RSC is a same entity, wherein all local ORS record categories belong to an RSC record category.

6. The method of claim 1, further comprising:
propagating, by the ERM, an organizational tree structure to the RMS, wherein only record categories which map to organization-specific retention schedules (ORSs) have an association with an organizational node.

7. The method of claim 6, further comprising:
determining, by the RMS, which record categories are relevant to a lower level of an organization within a known organizational tree if there is no organization-specific retention schedule-based records category for said the record categories, wherein the RMS:
traverses one level up the organizational tree;
checks if there is any ORS-based record category associated with a parent organization; and
if not, repeats the traversing and checking steps until an ORS-based record category is found or a top level of the organization tree is reached; and
reconciling, by the RMS, between an end user's organization and an organization local schedule that belongs to the user's organization;
wherein a complex corporate level tree of record categories is exposed as a relatively small sub-tree view applicable to the end user.

8. The method of claim 1, further comprising:
creating a subset of a corporate file plan applicable to a given instance of an RMS.

9. The method of claim 8, wherein:
the ERM is further configured to determine which instances of the RMS contain records that belong to certain organization-specific retention schedules (ORSs) by querying data in an ERM database which describes an association between data source records and ORS records; and
the ERM is further configured to traverse up to retention schedule codes (RSCs) of the ERM, then traversing up to record classes, to identify a subset of an overall record categorization hierarchy once a list of ORSs is defined.

10. The method of claim 8, further comprising:
passing, by the ERM, only those disposition rules and events which are applicable to a given subset of a file plan.

11. The method of claim 1, further comprising:
filtering only a relevant part of a record category tree for a particular RMS to integrate the ERM into multi-RMS environments.

12. The method of claim 1, further comprising:
using ERM business aliases to simplify record search and declaration.

13. The method of claim 12, further comprising:
communicating, by the ERM, business aliases and their associations with organization-specific retention schedules (ORSs) to the RMS; and
performing, by end users of the RMS, record declaration or searching through the RMS by choosing a familiar business alias.

14. The method of claim 13, wherein:
the ERM is further configured to filter a record category tree by organization.

15. The method of claim 12, further comprising: communicating the business aliases to end user applications when ingesting records through the end user applications.

16. The method of claim 12, further comprising:
exposing business aliases as folders or tags in legacy record migration tools.

17. The method of claim 12, further comprising:
disambiguating end user aliases by at least one of:
grouping the aliases into a hierarchy in which record category names or identifiers are presented as parent nodes of the hierarchy; and
prefixing or suffixing the aliases with a records category name or identifier always or whenever an ambiguity exists.

18. A computer implemented apparatus for propagation of file plans from an enterprise retention management system (ERM) to one or more records management systems (RMS), the apparatus comprising:
a processor-based RMS that is configured to store a plurality of records which need to be preserved for a certain period of time to meet companies' regulatory obligations, the records comprising documents with associated metadata;
a processor-based ERM that is configured as a source of master data about record classification and record retention, the ERM configured to perform maintenance of record classes and retention/disposition rules and to propagate information to the RMS according to any of the following:
automatically via a connector between the ERM and the RMS;
semi-automatically via end user export of file plan information from the ERM in a form understood by RMS import tools; and
manually; and
a mapping for translation between ERM and RMS objects to effect propagation of file plans which comprise a combination of a retention category tree, disposition schedules, and events, and which defines how records are stored and disposed of in a given RMS, from said ERM to said RMS, wherein the mapping for translation between ERM and RMS objects includes:

a mapping for translating ERM record classes within a classification of retention schedules to RMS record categories within a hierarchy of record categories set up within the RMS, and a mapping for translating ERM retention schedule codes (RSCs) into next level record categories under categories created from record classes.

19. A computer implemented method for propagation of information from an enterprise retention management system (ERM) to one or more records management systems (RMS) configured to store a plurality of records, the records comprising documents with associated metadata, which need to be preserved for a certain period of time to meet companies' regulatory obligations, the method comprising:

providing a processor-based ERM that is configured as a source of master data about record classification and record retention, the ERM configured to perform maintenance of record classes and retention/disposition rules and to propagate information to the RMS; and wherein the ERM is configured to provide a mapping for translation between ERM and RMS objects to effect propagation of file plans which comprise a combination of a retention category tree, disposition schedules, and events, and which defines how records are stored and disposed of in a given RMS, from the ERM to the RMS, the mapping including:

translating ERM record classes within a classification of retention schedules to RMS record categories within a hierarchy of record categories set up within the RMS, translating ERM retention schedule codes (RSCs) into next level record categories under categories created from record classes.

20. A computer implemented method for propagation of file plans from an enterprise retention management system (ERM) that is configured as a source of master data about record classification and record retention, the ERM configured to perform maintenance of record classes and retention/ disposition rules and to propagate information to one or more records management systems (RMS), the method comprising:

providing a processor-based RMS that is configured to store a plurality of records which need to be preserved for a certain period of time to meet companies' regulatory obligations, the records comprising documents with associated metadata; and providing a mapping for translation between ERM and RMS objects to effect propagation of file plans which comprise a combination of a retention category tree, disposition schedules, and events, and which defines how records are stored and disposed of in a given RMS, from the ERM to the RMS, including:

translating ERM record classes within a classification of retention schedules to RMS record categories within a hierarchy of record categories set up within the RMS, and translating ERM retention schedule codes (RSCs) into next level record categories under categories created from record classes.

21. An apparatus for propagation of information from an enterprise retention management system (ERM) to one or more records management systems (RMS) configured to store a plurality of records, the records comprising documents with associated metadata, which need to be preserved for a certain period of time to meet companies' regulatory obligations, the apparatus comprising:

a processor-based ERM that is configured as a source of master data about record classification and record retention, the ERM configured to perform maintenance of record classes and retention/disposition rules and to propagate information to the RMS; and a processor-based mapping for translation between ERM and RMS objects to effect propagation of file plans which comprise a combination of a retention category tree, disposition schedules, and events, and which defines how records are stored and disposed of in a given RMS, from the ERM to the RMS, the mapping for translation between ERM and RMS objects including:

a mapping for translating ERM record classes within a classification of retention schedules to RMS record categories within a hierarchy of record categories set up within the RMS, and a mapping for translating ERM retention schedule codes (RSCs) into next level record categories under categories created from record classes.

22. An apparatus for propagation of file plans from an enterprise retention management system (ERM) that is configured as a source of master data about record classification and record retention, the ERM configured to perform maintenance of record classes and retention/disposition rules and to propagate information to one or more records management systems (RMS), the apparatus comprising:

a processor-based RMS that is configured to store a plurality of records which need to be preserved for a certain period of time to meet companies' regulatory obligations, the records comprising documents with associated metadata; and a processor-based mapping for translation between ERM and RMS objects to effect propagation of file plans which comprise a combination of a retention category tree, disposition schedules, and events, and which defines how records are stored and disposed of in a given RMS, from the ERM to the RMS, the mapping for translation between ERM and RMS objects including:

a mapping for translating ERM record classes within a classification of retention schedules to RMS record categories within a hierarchy of record categories set up within the RMS, and a mapping for translating ERM retention schedule codes (RSCs) into next level record categories under categories created from record classes.

23. A computer readable, non-transitory storage medium programmed to store instructions which, when executed by a processor, execute the method of any of claims 1, 19, and 20.

24. A computer implemented method for propagation of file plans from an enterprise retention management system (ERM) to one or more records management systems (RMS), the method comprising:

providing a processor-based RMS that is configured to store a plurality of records which need to be preserved for a certain period of time to meet companies' regulatory obligations, the records comprising documents with associated metadata;

providing a processor-based ERM that is configured as a source of master data about record classification and record retention, the ERM configured to perform maintenance of record classes and retention/disposition rules and to propagate information to the RMS according to any of the following:

automatically via a connector between the ERM and the RMS;

semi-automatically via end user export of file plan information from the ERM in a form understood by RMS import tools; and manually; and wherein the ERM is configured to provide a mapping for translation between ERM and RMS objects to effect propagation of file plans which comprise a combination of a retention category tree, disposition schedules, and events, and which defines how records are stored and disposed of in a given RMS, from the ERM to the RMS, the mapping including:

translating ERM record classes within a classification of retention schedules to RMS record categories within a hierarchy of record categories set up within the RMS, and translating ERM organization-specific retention schedules (ORSs) into record categories under categories created from record classes.

* * * * *